(12) United States Patent
Shih

(10) Patent No.: US 12,006,962 B2
(45) Date of Patent: Jun. 11, 2024

(54) ANTI-VIBRATION ANTI-LOOSENING THREADED FASTENER

(71) Applicant: HUIXIANG PRECISION CO., LTD., Tainan (TW)

(72) Inventor: Sheng-Hsiung Shih, Tainan (TW)

(73) Assignee: Shoxproof Technology Co., Ltd., Tainan (TW)

( * ) Notice: Subject to any disclaimer, the term of this patent is extended or adjusted under 35 U.S.C. 154(b) by 543 days.

(21) Appl. No.: 17/199,753

(22) Filed: Mar. 12, 2021

(65) Prior Publication Data

US 2022/0290715 A1    Sep. 15, 2022

(51) Int. Cl.
  *F16B 41/00*   (2006.01)
  *F16B 35/06*   (2006.01)
  *F16B 37/14*   (2006.01)

(52) U.S. Cl.
  CPC ............ *F16B 41/002* (2013.01); *F16B 35/06* (2013.01); *F16B 37/14* (2013.01)

(58) Field of Classification Search
  CPC ........ F16B 31/02; F16B 31/025; F16B 35/06; F16B 35/044; F16B 37/14; F16B 39/28; G08B 5/00
  USPC ...................................................... 411/8, 14
  See application file for complete search history.

(56) References Cited

U.S. PATENT DOCUMENTS

| | | | | |
|---|---|---|---|---|
| 2,600,029 A | * | 6/1952 | Albert ................... | F16B 31/025 411/548 |
| 5,220,839 A | * | 6/1993 | Kibblewhite ........... | G01L 5/246 73/761 |
| 5,472,302 A | * | 12/1995 | Yandle, II ............. | F16B 31/025 411/383 |
| 5,855,460 A | * | 1/1999 | Brehmer ............... | B60T 17/086 411/383 |
| 7,614,303 B2 | * | 11/2009 | McInerney ........ | G01N 29/4409 73/598 |
| 10,316,881 B2 | * | 6/2019 | Brown ................. | C21D 9/0093 |
| 2006/0263166 A1 | * | 11/2006 | Kelly .................... | F16B 31/025 411/14 |

FOREIGN PATENT DOCUMENTS

| | | |
|---|---|---|
| CN | 208900501 U | 5/2019 |
| TW | I535941 B | 6/2016 |
| TW | 201812188 A | 4/2018 |
| TW | M562351 U | 6/2018 |

* cited by examiner

*Primary Examiner* — William D Hutton, Jr.
*Assistant Examiner* — Carl J Carlson
(74) *Attorney, Agent, or Firm* — Rosenberg, Klein & Lee

(57) ABSTRACT

An anti-vibration anti-loosening threaded fastener is revealed. The threaded fastener includes a bolt and a nut. The bolt consists of a head, a stud disposed on a bottom surface of the head, and a through hole mounted axially in the stud. The nut is composed of a threaded slotted portion provided with an opening facing upward and fastened to the stud by threaded connection, and a post protruding from central area of a bottom of the threaded slotted portion. The post and the through hole are disposed eccentrically to each other so that forces that pull the bolt and the nut together are generated when the bolt and the nut are threaded and fastened with each other and the post is mounted into the through hole. Thereby the bolt and the nut are fastened more tightly and the threaded fastener is vibration resistant and anti-loosening.

8 Claims, 5 Drawing Sheets

ANTI-VIBRATION ANTI-LOOSENING THREADED FASTENER

BACKGROUND OF THE INVENTION

Field of the Invention

The present invention relates to an anti-vibration anti-loosening threaded fastener, especially to an anti-vibration anti-loosening threaded fastener which is fastened and fixed tightly, without loosening or coining off easily.

Description of Related Art

Fasteners such as screws, nuts, etc. are used to join at least two workpieces. Once the fastener which is a small part is out of order and the two workpieces are not affixed firmly, the equipment and the machine are unable to operate accurately and even damaged and broken down.

Refer to Taiwanese Pat. App. Pub. No. 201812188A, a fastening washer is revealed. A plurality of inclined non-return teeth are disposed on a front surface of the washer and an outer end of the non-return teeth is provided with a sharp angle for being easily mounted into threaded fasteners and providing better no return effect. A plurality of positioning teeth are arranged at a rear surface of the washer in the direction opposite to the non-return teeth and each of the positioning teeth has a curved edge which is mounted in and contacted with the workpiece in large area for being connected to and positioned in the workpiece firmly. Thereby the fastening washer provides good non-return and fastening effect.

Refer to Taiwanese Pat. No. I535941B, a fixing assembly and a countersunk screw thereof are revealed. The fixing assembly includes a first plate, a second plate and a countersunk screw composed of a threaded part and a head part. The threaded part has an axis while the head part is disposed on one end of the threaded part and composed of a first circular wall surface and a second wall surface located between the first circular wall surface and the threaded part. A first acute angle is formed between the first circular wall surface and the axis while a second acute angle is formed between the second circular wall surface and the axis. The first acute angle is different from the second acute angle so that the countersunk screw is fastened in the first plate and the second is fastened in the second plate firmly, without projecting from the first plate. Therefore the issue of poor fastening of the countersunk screw in the conventional fixing assembly is addressed.

Refer to Chinese Pat. Pub. No. 208900501U, an anti-loose bolt and a locking tool of the anti-loose bolt is disclosed. The utility model relates to the technical field of fasteners. The anti-loose bolt includes a bolt body and a locking sleeve arranged on the bolt body. The bolt body comprises a nail head, a polished rod section matched with a connected workpiece, a locking section with a spiral groove formed in the surface and matched with the locking sleeve and a clamping section with an annular groove formed in the surface and fixed to an external locking tool. A pull-apart groove used for pulling apart the clamping section is formed in the joint of the locking section and the clamping section. The pull-apart groove is formed around the clamping section and the section of the pull-apart groove in the length direction of the bolt is "$\vee$"-shaped.

Refer to Taiwanese Pat. No. M562351U, a two-piece bolt assembly is revealed. The two-piece bolt assembly includes a bolt and a washer. The bolt consists of a bolt head and a bolt body which is composed of a threaded section spaced apart from the bolt head and provided with threads on the surface, and a connection section connected between the bolt head and the threaded section. The bolt head has a serrated head circular surface facing the bolt body, located around and connected to the connection section while the washer is a circular fit on the connection section and limited between the bolt head and the threaded section. The washer has an inner circular surface facing the bolt head and rotatably locked with the head circular surface of the bolt head, and an outer circular surface opposite to the inner circular surface. The head circular surface, the inner circular surface and the outer circular surface are all serrated for stopping the movement and preventing the loosening.

Thus there is room for improvement and there is a need to provide an anti-vibration anti-loosening threaded fastener due to the importance of the fastener to the accurate operation of the equipment and the machine.

SUMMARY OF THE INVENTION

Therefore it is a primary object of the present invention to provide an anti-vibration anti-loosening threaded fastener in which a bolt and a nut are engaged securely with each other by an axial through hole of the bolt mounted and mated with a central post of the nut eccentrically, without loosening or coining off easily.

It is another object of the present invention to provide an anti-vibration anti-loosening threaded fastener in which a sensor is mounted in a through hole for detecting fastening state between the bolt and the nut and taking real-time measurement while the bolt or the nut come loose in order to avoid danger to life and property.

In order to achieve the above objects, an anti-vibration anti-loosening threaded fastener according to the present invention includes a bolt and a nut. The bolt is formed by a head, a stud disposed on a bottom surface of the head, and a through hole mounted axially in the stud. The nut consists of a threaded slotted portion provided with an opening facing upward and fastened to the stud by threaded connection, and a post protruding from central area of a bottom of the threaded slotted portion. Either the post or the through hole is in eccentric arrangement so that the post and the through hole are eccentric to each other. The post and the through hole are mated eccentrically and connected firmly to each other when the bolt and the nut are threaded and fastened with each other.

Preferably, the through hole is a round hole while the post is a cylinder which is matched with the through hole.

Preferably, the through hole is penetrating the head.

Preferably, a sensor is further mounted in the through hole. While the bolt is threaded and fastened with the nut securely, the post contacts and presses the sensor.

The present invention has the following advantages:

1. The through hole formed axially in the stud of the bolt and the post at central area of the threaded slotted portion of the nut are eccentrically mated with each other. When the bolt and the nut are fastened with each other, the post is inserted into and mated with the through hole to generate vertical and horizontal forces which pull the bolt and the nut together and connect the bolt with the nut more tightly. The displacement between the bolt and the nut can be avoided and the purposes of vibration resistance and loosening resistance are achieved.
2. A sensor is further mounted in the through hole of the bolt. While the bolt is threaded and fastened with the nut, the post contacts and presses the sensor for checking the fastening state between the bolt and the nut. When the sensor detects no press/contact force applied by the post, loosening occurs between the bolt and the nut. Then a message is sent to inform relevant people about the condition so as to avoid danger to life and property caused by the loosening.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical content and functions of the present invention more completely and clearly, please refer to the following embodiments with detailed descriptions together with the related figures and numbers therein.

Figure 1:
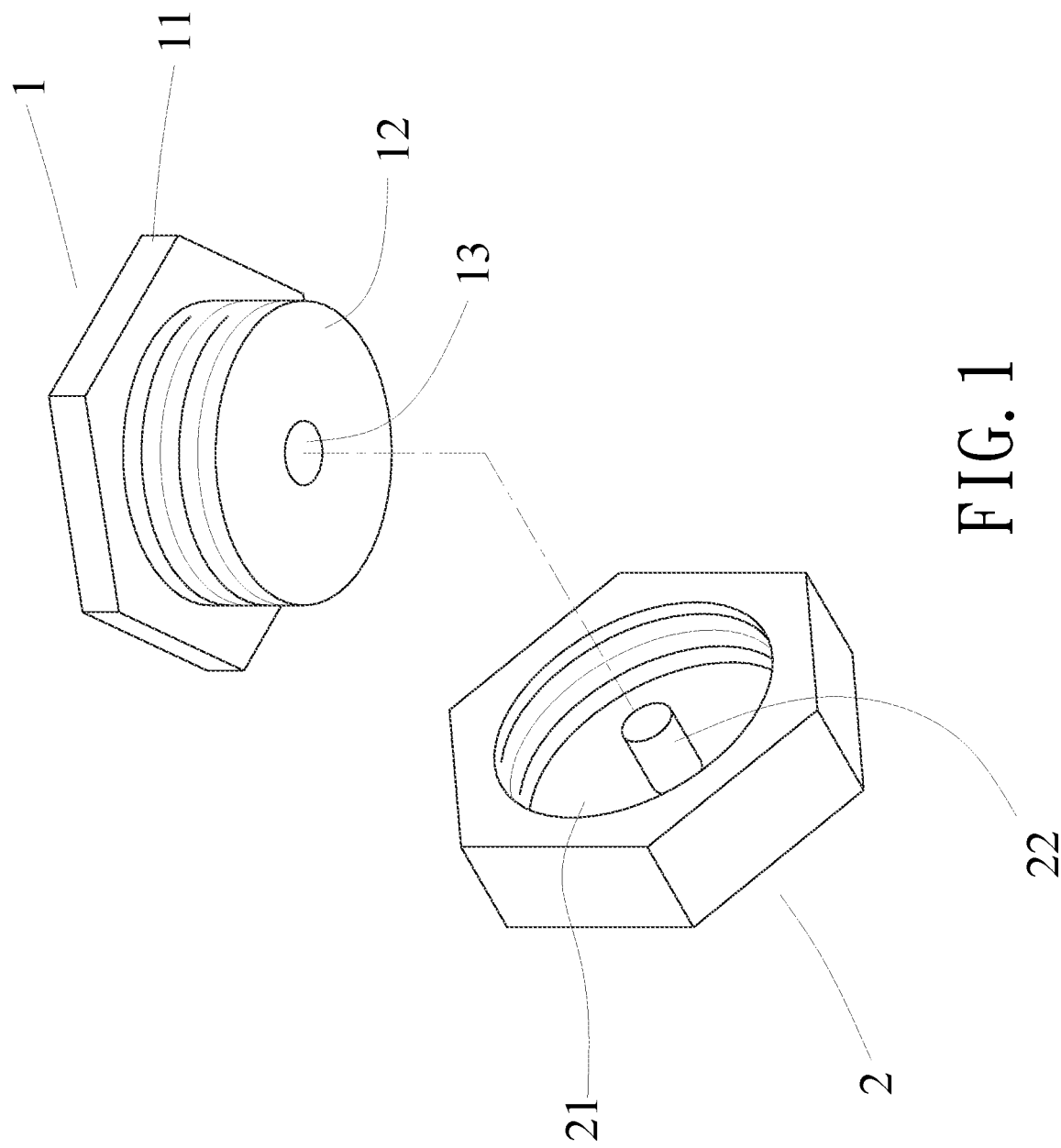
FIG. 1 is an explosive view of an embodiment of an anti-vibration anti-loosening threaded fastener according to the present invention.
Figure 2:
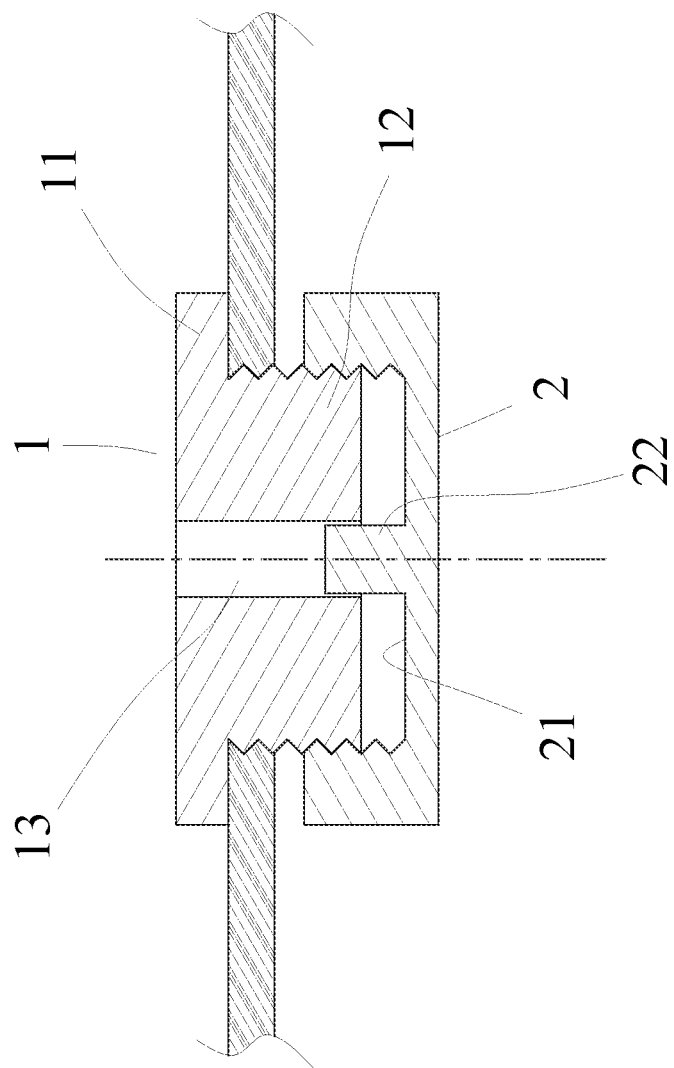
FIG. 2 is a sectional view of an embodiment in which an assembly of a bolt and a nut being threaded and under tightened according to the present invention.
Figure 3:
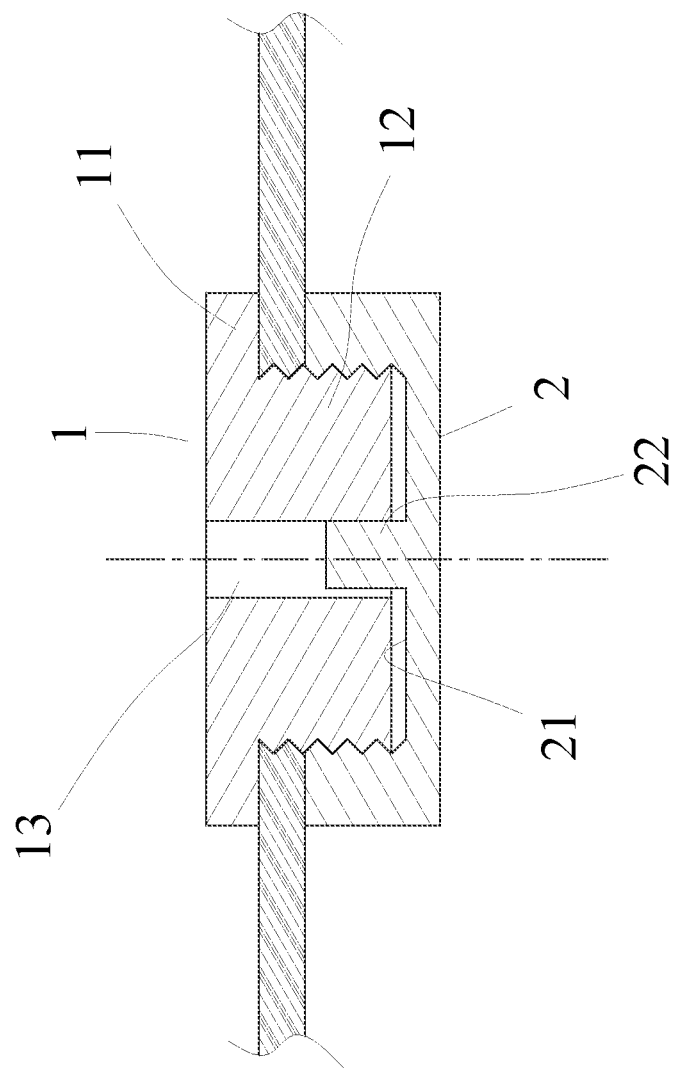
FIG. 3 is a sectional view of an embodiment in which an assembly of a bolt and a nut already tightened according to the present invention.
Figure 4:
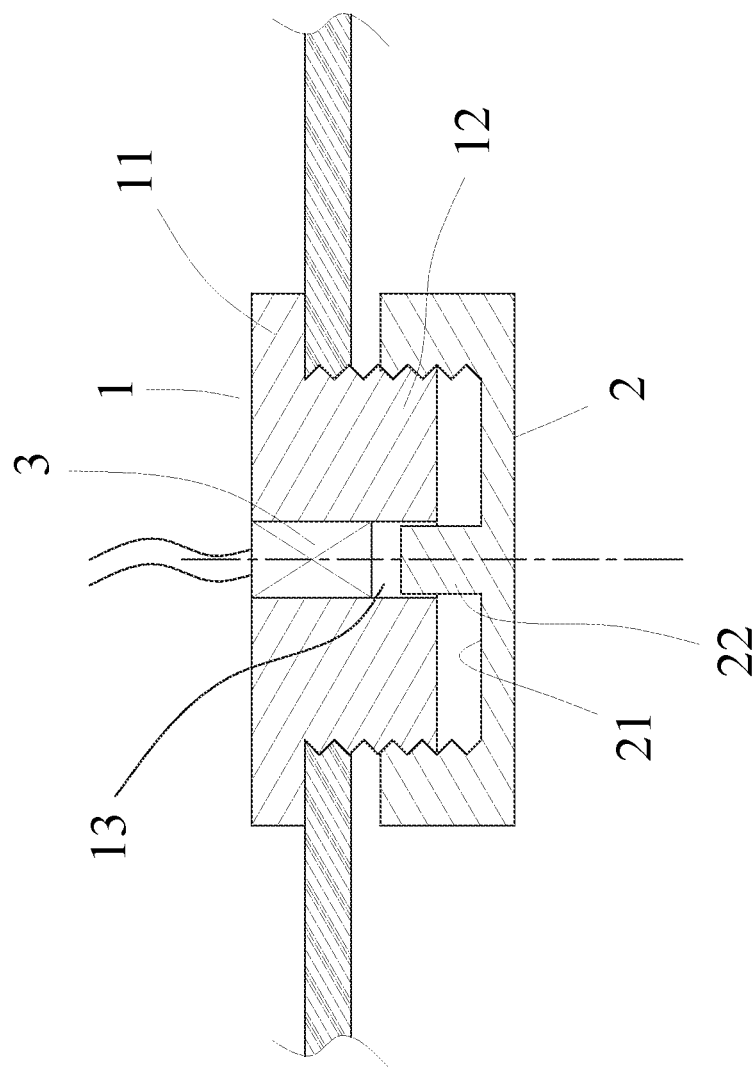
FIG. 4 is a sectional view of an embodiment in which a sensor is mounted therein and an assembly of a bolt and a nut being threaded and under tightened according to the present invention.
Figure 5:
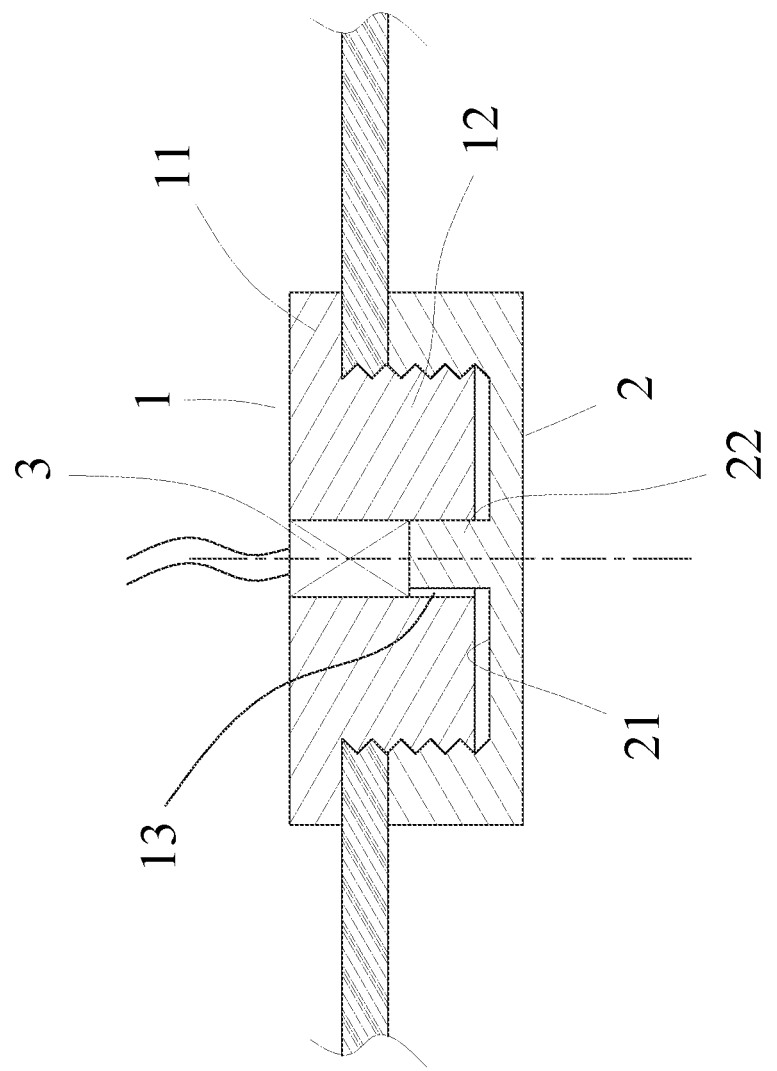
FIG. 5 is a sectional view of an embodiment in which a sensor is mounted therein and an assembly of a bolt and a nut already tightened according to the present invention.

Refer to FIG. 1 and FIG. 2, an anti-vibration anti-loosening threaded fastener according to the present invention includes a bolt 1 and a nut 2.

The bolt 1 consists of a head 11, a stud 12 extending downward from a bottom surface of the head 11 and provided with threads on a surface thereof, and a through hole 13 mounted axially in the stud 12 and penetrating the head 11.

The nut 2 which looks like a hat has a threaded slotted portion 21 with an opening facing upward and threads arranged at the periphery thereof, and a post 22 protruding from central area of a bottom of the threaded slotted portion 21. The threaded slotted portion 21 and the stud 12 are fastened to each other by threaded connection. The post 22 and the through hole 13 are mated when the bolt 1 and the nut 2 are threaded and fastened with each other. It should be noted that either the post 22 or the through hole 13 is eccentrically disposed so that the post 22 and the through hole 13 are eccentric to each other. In this embodiment, the post 22 is arranged eccentrically.

In this embodiment, the through hole 13 on the stud 12 of the bolt 1 is a round hole while the post 22 in the threaded slotted portion 21 of the nut 2 is a cylinder.

By the eccentric relationship of the through hole 13 mounted axially in the stud 12 of the bolt 1 with respect to the post 22 protruding from the central area of the bottom of the threaded slotted portion 21 of the nut 2, not only the post 22 can be inserted into and mated with the through hole 13, forces in vertical and horizontal directions with varying degrees are generated and acting on the post 22 and the through hole 13 to suppress displacement between the nut 2 and the bolt 1 caused by vibrations when the nut 2 and the bolt 1 are threaded and fastened with each other. Thereby while the equipment or the machine works and further generate vibrations, the displacement caused by vibrations between the bolt 1 and the nut 2 are suppressed by eccentrically mating and limiting relationship between the through hole 13 and the post 22. Thereby the purposes of vibration resistance and loosening resistance are achieved.

A sensor 3 is further mounted in the through hole 13 of the bolt 1. While the bolt 1 is threaded and fastened with the nut 2 securely, the post 22 of the nut 2 contacts and presses the sensor 3 for checking the fastening state between the bolt 1 and the nut 2. When the post 22 of the nut 2 is not in contact with and pressing the sensor 3, the loosening occurs between the bolt 1 and the nut 2. At the moment, the sensor 3 sends a message to inform relevant people about the condition so that they can perform on-site check and maintenance service and avoid danger to life and property caused by loosening bolts and nuts.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. An anti-vibration anti-loosening threaded fastener comprising:
   a bolt having a head, a threaded stud extending from a bottom surface of the head, the stud having a bore formed axially in the stud;
   a nut having a cavity formed therein, the cavity having opposing open and closed ends and a threaded portion formed on a circumferential wall of the cavity, the open end of the cavity being configured for threaded engagement with the stud; and
   a post protruding axially from a central area of a bottom of the cavity and passing into the bore of the stud,
   wherein one of the bore or the post is eccentrically disposed with respect to an axis of the stud and they are thereby eccentrically mated one with respect to the other and forcibly contact one another when the bolt and the nut are threadedly fastened to each other to thereby resist loosening of the nut relative to the bolt.

2. The threaded fastener as claimed in claim 1, wherein the bore is a round hole while the post is a cylinder configured to be received within the bore.

3. The threaded fastener as claimed in claim 2, wherein the bore penetrates the head.

4. The threaded fastener as claimed in claim 3, further comprising a sensor mounted in the bore, wherein the post contacts and presses against the sensor when the bolt is threaded and fastened with the nut securely, wherein the sensor detects a pressing force of the post.

5. The threaded fastener as claimed in claim 2, further comprising a sensor mounted in the bore, wherein the post contacts and presses against the sensor when the bolt is threaded and fastened with the nut securely, wherein the sensor detects a pressing force of the post.

6. The threaded fastener as claimed in claim 1, wherein the bore penetrates the head.

7. The threaded fastener as claimed in claim 6, further comprising a sensor mounted in the bore, wherein the post contacts and presses against the sensor when the bolt is threaded and fastened with the nut securely, wherein the sensor detects a pressing force of the post.

8. The threaded fastener as claimed in claim 1, further comprising a sensor mounted in the bore, wherein the post contacts and presses against the sensor when the bolt is threaded and fastened with the nut securely, wherein the sensor detects a pressing force of the post.

* * * * *